US012804185B2

(12) United States Patent
Aristarkhov

(10) Patent No.: US 12,804,185 B2
(45) Date of Patent: Nov. 17, 2026

(54) METHODS AND APPARATUS FOR EFFICIENT EXECUTION OF CONVOLUTIONAL NEURAL NETWORKS FOR COMPRESSED VIDEO SEQUENCES

(71) Applicant: Intel Corporation, Santa Clara, CA (US)

(72) Inventor: Vasilii Aristarkhov, Magdeburg (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/326,767

(22) Filed: May 31, 2023

(65) Prior Publication Data

US 2024/0406433 A1 Dec. 5, 2024

(51) Int. Cl.

| | |
|---|---|
| ***G06K 9/62*** | (2022.01) |
| ***G06V 10/74*** | (2022.01) |
| ***G06V 10/82*** | (2022.01) |
| ***H04N 19/513*** | (2014.01) |

(52) U.S. Cl.
CPC ......... *H04N 19/513* (2014.11); *G06V 10/761* (2022.01); *G06V 10/82* (2022.01)

(58) Field of Classification Search
CPC ..... H04N 19/513; G06V 10/761; G06V 10/82
See application file for complete search history.

(56) References Cited

U.S. PATENT DOCUMENTS

| | | | | |
|---|---|---|---|---|
| 11,562,153 | B1 * | 1/2023 | Etwaru | G06F 40/58 |
| 2019/0332897 | A1 * | 10/2019 | Chen | G06T 7/215 |
| 2020/0225877 | A1 * | 7/2020 | Nakashima | G06F 18/214 |
| 2024/0212349 | A1 * | 6/2024 | Chan | G06V 20/52 |
| 2024/0406433 | A1 * | 12/2024 | Aristarkhov | G06V 10/761 |

* cited by examiner

*Primary Examiner* — Howard D Brown, Jr.
(74) *Attorney, Agent, or Firm* — Hanley, Flight & Zimmerman, LLC

(57) ABSTRACT

Example apparatus disclosed includes at least one memory, machine readable instructions, and programmable circuitry to at least one of instantiate or execute the machine readable instructions to process a first frame of a video sequence with a neural network, store intermediate outputs of at least one of a convolution layer or a pooling layer of the neural network, the intermediate outputs associated with the first frame, process a second frame of the video sequence based on the intermediate outputs associated with the first frame to skip processing of a temporally static area of the second frame by the at least one of the convolution layer or a pooling layer, the temporally static image area common to the first frame and the second frame.

20 Claims, 17 Drawing Sheets

1300

| SEQUENCE (1305) | 2mbps (1310) | 4mbps (1315) | 6mbps (1320) | 8mbps (1325) |
|---|---|---|---|---|
| WITCHER3 | 79% | 68% | 57% | 50% |
| DOTA | 83% | 75% | 70% | 66% |
| GTAV | 74% | 62% | 52% | 46% |
| COUNTERSTRIKE | 79% | 69% | 62% | 58% |
| BQ_TERRASE | 81% | 74% | 68% | 63% |
| CROWD_RUN | 69% | 67% | 61% | 54% |

FIG. 13

METHODS AND APPARATUS FOR EFFICIENT EXECUTION OF CONVOLUTIONAL NEURAL NETWORKS FOR COMPRESSED VIDEO SEQUENCES

FIELD OF THE DISCLOSURE

This disclosure relates generally to neural networks, and, more particularly, to methods, systems, and apparatus for efficient execution of convolutional neural networks for compressed video sequences.

BACKGROUND

Deep neural networks (DNNs) have revolutionized the field of artificial intelligence (AI) as applied in many domains including computer vision, speech processing, and natural language processing. At least some DNN-based learning algorithms focus on how to efficiently execute already trained models (e.g., using inference) and how to evaluate DNN computational efficiency. Improvements in efficient training of DNN models can be useful in areas of image recognition/classification, machine translation, speech recognition, and recommendation systems, among others.

BRIEF DESCRIPTION OF THE DRAWINGS

FIG. 13 illustrates an example table with percentages of skipped macroblocks after the encoding of different 1080p sequences.

Figure 1:
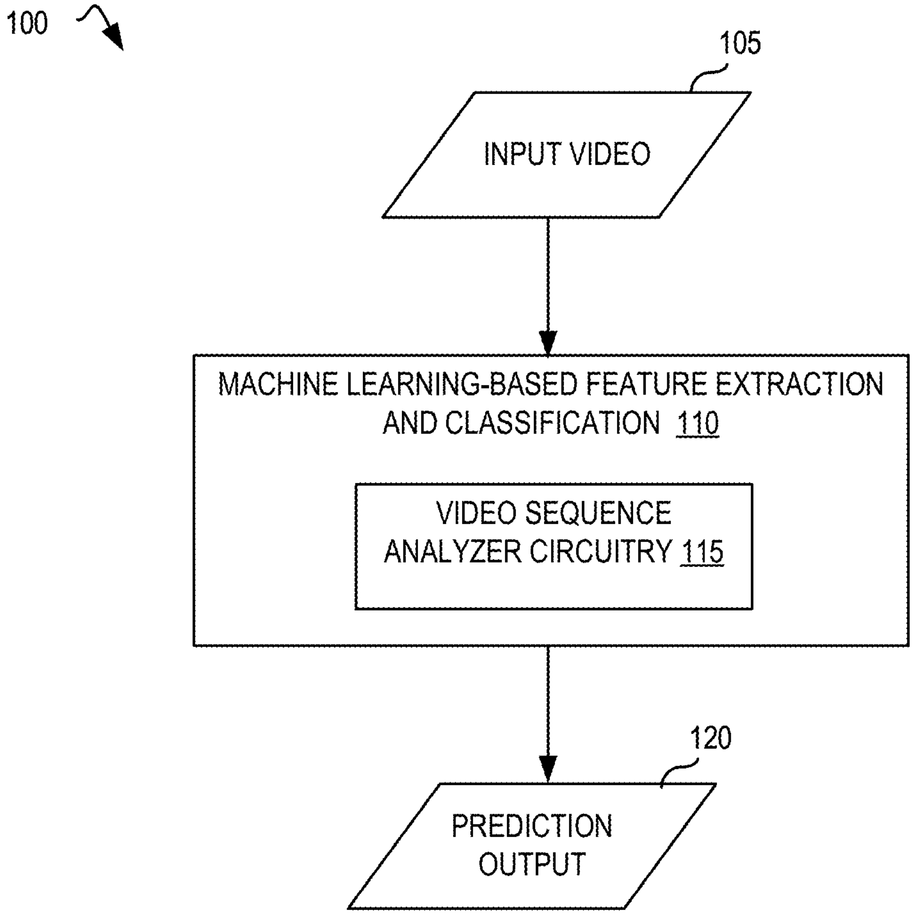
FIG. 1 is an example environment in which video sequence analysis is performed using example video sequence analyzer circuitry in accordance with teachings disclosed herein.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Deep neural networks (DNNs) have revolutionized the field of artificial intelligence (AI) as applied in many domains including computer vision, speech processing, and natural language processing. More specifically, neural networks are used in machine learning (ML) to allow a computer to learn to perform certain tasks by analyzing training examples. For example, an object recognition system can be fed labeled images of objects (e.g., cars, trains, animals, etc.) to allow the system to identify visual patterns in such images that consistently correlate with a particular object label. DNNs rely on multiple layers to progressively extract higher-level features from raw data input (e.g., from identifying edges of a human being using lower layers to identifying actual facial features using higher layers, etc.). In particular, convolutional neural networks (CNNs) are widely applied in large-scale computer vision and video recognition applications, including tasks such as style transfer, object tracking, 3D reconstruction, as well as facial and action-based recognition. For example, a CNN can be used to receive images as input and use the received images to train a classifier. For example, the CNN can include a convolution layer, a pooling layer, an activation layer, and a fully connected layer for performing feature learning and classification. CNNs used for object detection and image classification include Region-based Convolutional Neural Networks (R-CNN), Fast R-CNN, VGGNet, AlexNet, and Residual Neural Network (ResNet).

ML-based analysis of video sequences includes direct per-frame analysis (e.g., where image-based ML networks process individual frames in the sequence), 3D CNN algorithms with additional temporal dimension(s), two streams-based architecture(s), etc. In some examples, ML analyzes only part of the frames in the spatial domain (e.g., images) and builds an optical flow to analyze the remaining ones temporally. Direct per-frame analysis using modern CNN architectures can be overcomplex and inefficient due to a high temporal correlation of neighbor frames which is ignored during analysis. Likewise, special video-based architectures to analyze sequences temporally have other characteristics (e.g., reduced accuracy) and are not able to replace the original widely used image-based CNN schemes.

As such, existing ML analysis for computer vision and video recognition applications can introduce temporal redundancy when neighbor frames are very similar but still require ML-based processing. For example, directly running per-frame processing of 60-120 frames per second (FPS) in video sequences with modern image recognition-based CNNs (e.g., ResNet, AlexNet or VGG) introduces additional complexity. At the same time, the introduction of special neural network architectures for video analysis (e.g., a two-stream architecture for spatial and temporal domains, three-dimensional CNN, etc.) does not guarantee the same accuracy as well-known image recognition architectures.

Methods and apparatus disclosed herein introduce effective execution and optimization of image-based existing ML networks for video sequences. In examples disclosed herein, per-layer CNN intermediate data of a current frame is retained and used for subsequent frame processing to simplify the machine-learning analysis (e.g., skipping calculations of temporal stable or predicted regions of the frames). Examples disclosed herein can be applied to any image recognition and detection neural network (e.g., VGG, AlexNet, ResNet, etc.) to process video sequences with equivalent accuracy but improved processing speed. As such, the machine learning-based analysis introduced herein uses results of the analysis from previous frames. For example, intermediate results of the CNN-based convolution/pooling layers (e.g., fully-connected dense layers) between frames can be saved and used for ML processing of subsequent frames. Such optimization can eliminate any convolution and activation calculations up to a flatten layer for static regions of video sequence frames. In some examples, per-layer CNN results can be stored in a buffer after CNN processing of each frame and this stored data can be retrieved before the next frame processing. As such, real convolution calculation(s) for static regions can be replaced based on results obtained during processing of previous frames. While in the examples described herein the example neural network used is a CNN, the methods and apparatus disclosed herein can be applied to any other type of neural network.

FIG. 1 is an example environment 100 in which video sequence analysis is performed using an example video sequence analyzer circuitry in accordance with teachings disclosed herein. In the example of FIG. 1, an input video 105 (e.g., input video sequence) is provided to a network for machine learning-based feature extraction and classification 110 (e.g., convolutional neural network). In the example of FIG. 1, the feature extraction and classification 110 includes video sequence and analyzer circuitry 115, which is described in more detail in connection with FIG. 2. The feature extraction and classification 110 can be performed by the convolutional neural network to obtain a prediction output 120 based on the input video 105. For example, convolutions applied as part of the CNN can be used in image processing for feature detection without cancelling spatial associations between pixels. Additionally, convolutions reduce data dimensions and produce data sets with reduced redundancy (e.g., a feature map). For example, feature extraction and redundancy reduction take place in the convolutional layers and pooling layers of the CNN, features are combined partially, the resulting features each counting for a part of a labelled class configuration, and top features are input into a fully-connected layer of the CNN to identify an estimate of the classification and subsequently the prediction output 120, as described in more detail in connection with FIG. 5. In examples disclosed herein, the video sequence and analyzer circuitry 115 saves the intermediate results and/or intermediate outputs of the convolution/pooling layers between frames of an input video sequence (e.g., input video 105) and uses the saved intermediate results for processing of the next frames. As described in more detail in connection with FIGS. 5-8, such optimization can eliminate convolution and activation calculations up to a flatten layer for static regions.

Figure 2:
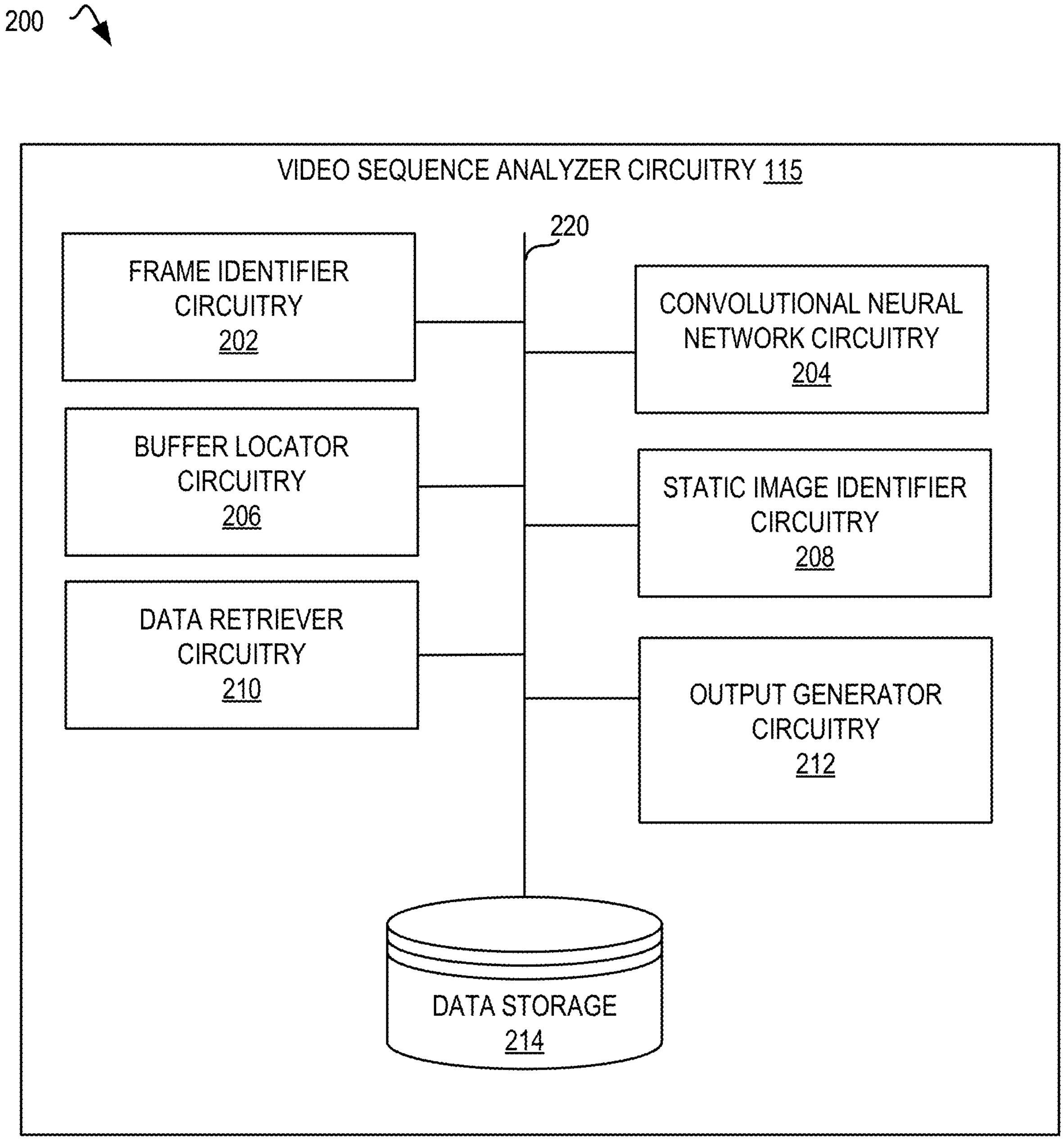
FIG. 2 is a block diagram representative of the video sequence analyzer circuitry that may be implemented in the example environment of FIG. 1.

FIG. 2 is a block diagram of an example implementation of the video sequence analyzer circuitry 115 of FIG. 1. The video sequence analyzer circuitry 115 of FIG. 1 may be instantiated (e.g., creating an instance of, bring into being for any length of time, materialize, implement, etc.) by programmable circuitry such as a Central Processing Unit (CPU) executing first instructions. Additionally or alternatively, the video sequence analyzer circuitry 115 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the example of FIG. 2, the video sequence analyzer circuitry 115 includes example frame identifier circuitry 202, example convolutional neural network circuitry 204, example buffer locator circuitry 206, example static image identifier circuitry 208, example data retriever circuitry 210, example output generator circuitry 212, and/or example data storage 214. In the example of FIG. 2, the frame identifier circuitry 202, convolutional neural network circuitry 204, buffer locator circuitry 206, static image identifier circuitry 208, data retriever circuitry 210, output generator circuitry 212, and/or data storage 214 are in communication via an example bus 220.

The frame identifier circuitry 202 identifies frame(s) associated with the input video sequence (e.g., input video 105 of FIG. 1). For example, the frame identifier circuitry 202 identifies a first frame of the video sequence, a second frame of the video sequence, etc. In some examples, the frame identifier circuitry 202 determines whether all frames of the video sequence have been processed (e.g., using the convolutional neural network). In some examples, the frame identifier circuitry 202 locates frames that can be skipped, as determined based on an assessment of temporally static image area(s) in the video sequence using the static image identifier circuitry 208.

The convolutional neural network circuitry 204 processes the input frame(s) identified using the frame identifier circuitry 202. For example, the convolutional neural network circuitry 204 passes the frame(s) through convolution layer(s) and pooling layer(s) associated with the CNN as part of feature extraction. In some examples, the convolutional neural network circuitry 204 performs classification and/or detection using flatten and full-dense layers of the network (e.g., to obtain the prediction output 120 based on the input video 105), as described in more detail in connection with FIG. 5.

The buffer locator circuitry 206 identifies buffer(s) that can be used to save intermediate results of the convolution/pooling layer(s) obtained using the convolutional neural network circuitry 204. For example, the buffer locator circuitry 206 updates buffer(s) between the processing of individual frames associated with the input video sequence. As such, the buffer locator circuitry 206 saves and stores per-layer CNN results into the buffer(s) after CNN processing of each frame, such that the data is available for processing of a subsequent frame in the video sequence, as described in more detail in connection with FIGS. 6-8. For example, data saved in the buffer(s) can be used to replace real convolution calculations for static regions of the subsequent frame.

The static image identifier circuitry 208 identifies static image area(s) in a video sequence. For example, the static image identifier circuitry 208 detects temporally static regions in the video sequence. In some examples, the static image identifier circuitry 208 stores a previous frame (e.g., in the pixel domain) and subtracts the previous frame from a current frame, as described in connection with FIG. 10. In some examples, the static image identifier circuitry 208 uses encoding information from a motion compensation process to identify static image area(s). For example, in motion compensation-based static image detection, previous frames are retained and a difference between the current frame and the previous frame is encoded with the help of motion vectors, as described in connection with FIG. 11.

The data retriever circuitry 210 retrieves intermediate video sequence processing results stored in buffer(s) by the buffer locator circuitry 206. For example, the data retriever circuitry 210 retrieves pre-calculated processing results (e.g., from the convolution/pooling layers of the CNN) from the buffer. In some examples, the data retriever circuitry 210 retrieves the stored data associated with a previous frame when an upcoming frame is not skipped (e.g., where frame skipping is determined using the static image identifier circuitry 208 based on temporally static image area(s) in the video sequence).

The output generator circuitry 212 outputs the processing results associated with assessing the input video sequence (e.g., input video 105 of FIG. 1). In some examples, the output generator circuitry 212 outputs stored intermediate video sequence processing results from the buffer(s). In some examples, the output generator circuitry 212 outputs static image areas encoded with skipped macroblocks (e.g., indicating no difference with previous frames), resulting from motion compensation analysis performed using the static image identifier circuitry 208. In some examples, the output generator circuitry 212 outputs results associated with the percentage of skipped macroblocks following the encoding of different 1080p sequences, as shown in connection with FIG. 13.

The data storage 214 can be used to store any information associated with the frame identifier circuitry 202, convolutional neural network circuitry 204, buffer locator circuitry 206, static image identifier circuitry 208, data retriever circuitry 210, and/or output generator circuitry 212. The example data storage 214 of the illustrated example of FIG. 2 can be implemented by any memory, storage device and/or storage disc for storing data such as flash memory, magnetic media, optical media, etc. Furthermore, the data stored in the example data storage 214 can be in any data format such as binary data, comma delimited data, tab delimited data, structured query language (SQL) structures, image data, etc.

In some examples, the apparatus includes means for identifying frames of a video sequence. For example, the means for identifying frames may be implemented by frame identifier circuitry 202. In some examples, the frame identifier circuitry 202 may be instantiated by programmable circuitry such as the example programmable circuitry 1412 of FIG. 14. For instance, the frame identifier circuitry 202 may be instantiated by the example microprocessor 1500 of FIG. 15 executing machine executable instructions such as those implemented by at least block 305 of FIG. 3. In some examples, the frame identifier circuitry 202 may be instantiated by hardware logic circuitry, which may be implemented by an ASIC, XPU, or the FPGA circuitry 1600 of FIG. 16 structured to perform operations corresponding to the machine readable instructions. Additionally or alternatively, the frame identifier circuitry 202 may be instantiated by any other combination of hardware, software, and/or firmware. For example, the frame identifier circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for executing a convolutional neural network. For example, the means for executing a convolutional neural network may be implemented by convolutional neural network circuitry 204. In some examples, the convolutional neural network circuitry 204 may be instantiated by programmable circuitry such as the example programmable circuitry 1412 of FIG. 14. For instance, the convolutional neural network circuitry 204 may be instantiated by the example microprocessor 1500 of FIG. 15 executing machine executable instructions such as those implemented by at least block 310 of FIG. 3. In some examples, the convolutional neural network circuitry 204 may be instantiated by hardware logic circuitry, which may be implemented by an ASIC, XPU, or the FPGA circuitry 1600 of FIG. 16 structured to perform operations corresponding to the machine readable instructions. Additionally or alternatively, the convolutional neural network circuitry 204 may be instantiated by any other combination of hardware, software, and/or firmware. For example, the convolutional neural network circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for locating and saving data to a buffer. For example, the means for locating and saving data to a buffer may be implemented by buffer locator circuitry 206. In some examples, the buffer locator circuitry 206 may be instantiated by programmable circuitry such as the example programmable circuitry 1412 of FIG. 14. For instance, the buffer locator circuitry 206 may be instantiated by the example microprocessor 1500 of FIG. 15 executing machine executable instructions such as those implemented by at least block 315 of FIG. 3. In some examples, the buffer locator circuitry 206 may be instantiated by hardware logic circuitry, which may be implemented by an ASIC. XPU, or the FPGA circuitry 1600 of FIG. 16 structured to perform operations corresponding to the machine readable instructions. Additionally or alternatively, the buffer locator circuitry 206 may be instantiated by any other combination of hardware, software, and/or firmware. For example, the buffer locator circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a static image. For example, the means for identifying a static image may be implemented by static image identifier circuitry 208. In some examples, the static image identifier circuitry 208 may be instantiated by programmable circuitry such as the example programmable circuitry 1412 of FIG. 14. For instance, the static image identifier circuitry 208 may be instantiated by the example microprocessor 1500 of FIG. 15 executing machine executable instructions such as those implemented by at least block 325 of FIG. 3. In some examples, the static image identifier circuitry 208 may be instantiated by hardware logic circuitry, which may be implemented by an ASIC, XPU, or the FPGA circuitry 1600 of FIG. 16 structured to perform operations corresponding to the machine readable instructions. Additionally or alternatively, the static image identifier circuitry 208 may be instantiated by any other combination of hardware, software, and/or firmware. For example, the static image identifier circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for retrieving data. For example, the means for retrieving data may be implemented by data retriever circuitry 210. In some examples, the data retriever circuitry 210 may be instantiated by programmable circuitry such as the example programmable circuitry 1412 of FIG. 14. For instance, data retriever circuitry 210 may be instantiated by the example microprocessor 1500 of FIG. 15 executing machine executable instructions such as those implemented by at least block 340 of FIG. 3. In some examples, the data retriever circuitry 210 may be instantiated by hardware logic circuitry, which may be implemented by an ASIC, XPU, or the FPGA circuitry 1600 of FIG. 16 structured to perform operations corresponding to the machine readable instructions. Additionally or alternatively, the data retriever circuitry 210 may be instantiated by any other combination of hardware, software, and/or firmware. For example, the data retriever circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating output data. For example, the means for generating output data may be implemented by output generator circuitry 212. In some examples, the output generator circuitry 212 may be instantiated by programmable circuitry such as the example programmable circuitry 1412 of FIG. 14. For instance, output generator circuitry 212 may be instantiated by the example microprocessor 1500 of FIG. 15 executing machine executable instructions such as those implemented by at least block 335 of FIG. 3. In some examples, the output generator circuitry 212 may be instantiated by hardware logic circuitry, which may be implemented by an ASIC, XPU, or the FPGA circuitry 1600 of FIG. 16 structured to perform operations corresponding to the machine readable instructions. Additionally or alternatively, the output generator circuitry 212 may be instantiated by any other combination of hardware, software, and/or firmware. For example, the output generator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing video sequence analyzer circuitry 115 of FIG. 1 is illustrated in FIG. 2, one or more of the elements, processes and/or devices illustrated in FIG. 2 may be combined, divided, re-arranged, omitted, eliminated and/or implemented in any other way. Further, the example frame identifier circuitry 202, example convolutional neural network circuitry 204, example buffer locator circuitry 206, example static image identifier circuitry 208, example data retriever circuitry 210, example output generator circuitry 212, and/or, more generally, the example video sequence analyzer circuitry 115 of FIG. 2 may be implemented by hardware, software, firmware and/or any combination of hardware, software and/or firmware. Thus, for example, any of the example frame identifier circuitry 202, example convolutional neural network circuitry 204, example buffer locator circuitry 206, example static image identifier circuitry 208, example data retriever circuitry 210, example output generator circuitry 212, and/or, more generally, the example video sequence analyzer circuitry 115 of FIG. 2 could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s), ASIC(s)), programmable logic device (s) (PLD(s)), and/or field programmable logic device(s) (FPLD(s)) such as FPGAs. Further still, the video sequence analyzer circuitry 115 of FIG. 2 may include one or more elements, processes, and/or devices in addition to, or instead of, those illustrated in FIG. 2, and/or may include more than one of any or all of the illustrated elements, processes and devices.

Figure 3:
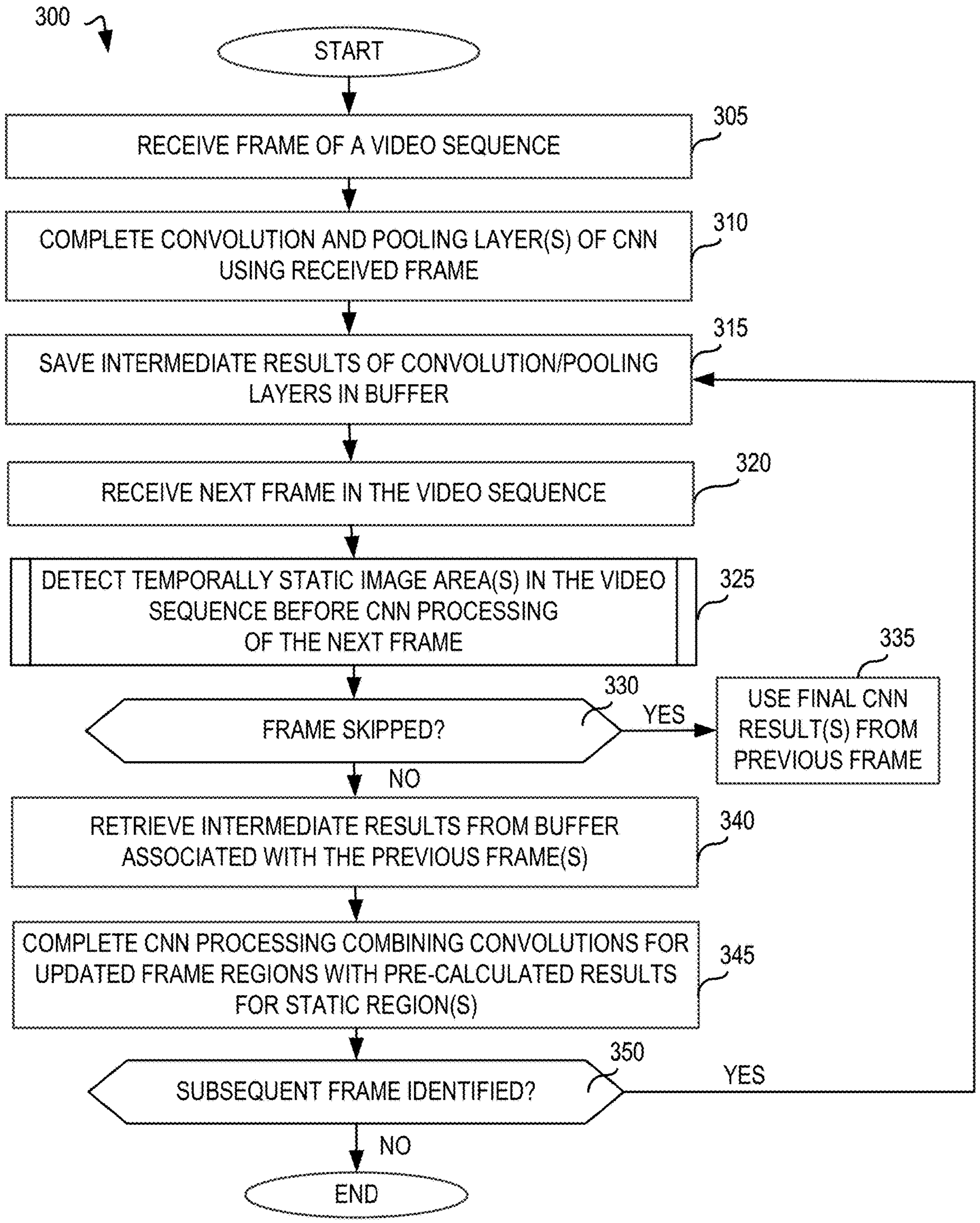
FIG. 3 is a flowchart representative of example machine-readable instructions and/or example operations that may be executed, instantiated, and/or performed by example programmable circuitry to implement the example video sequence analyzer circuitry of FIG. 1.
Figure 4:
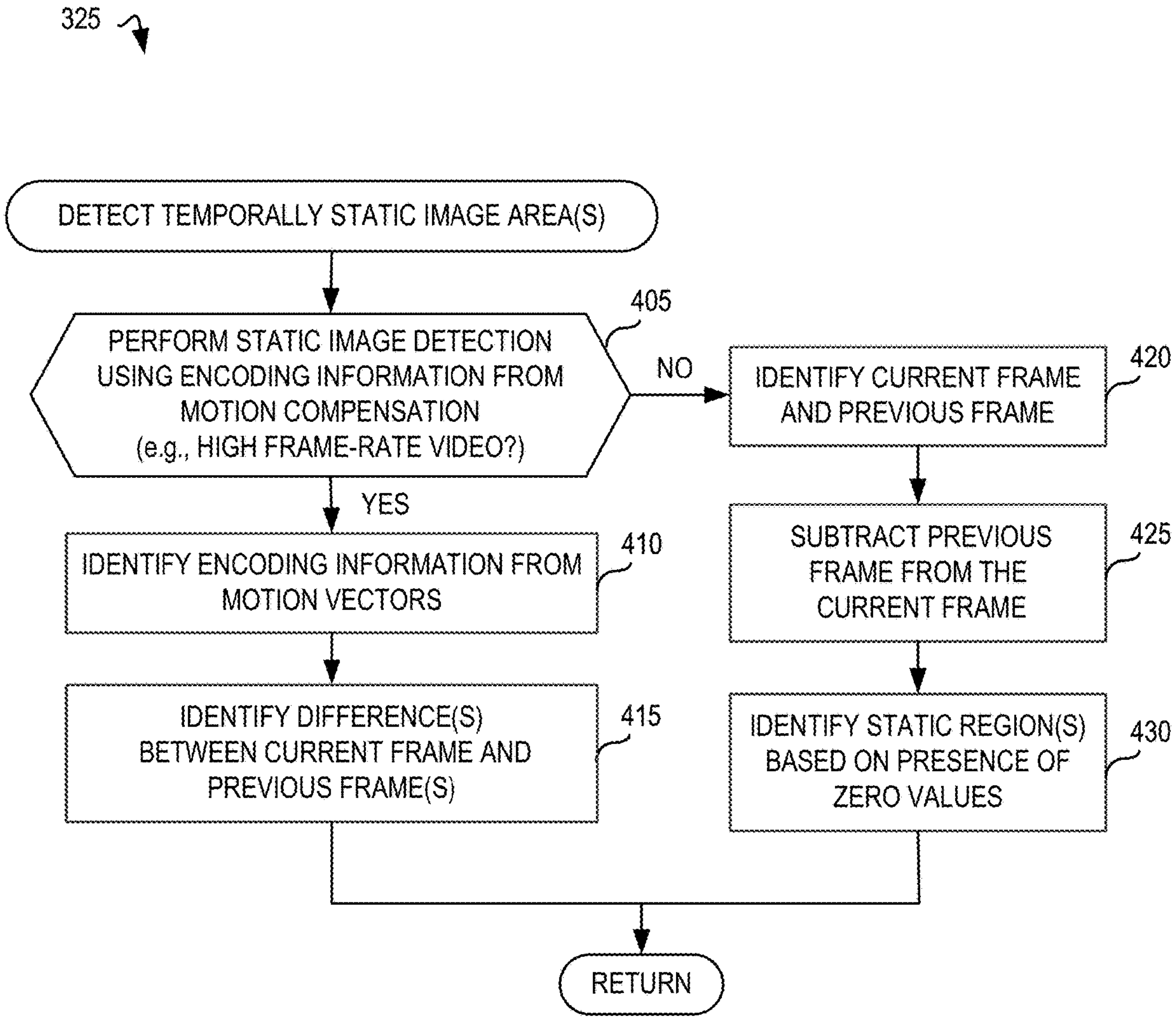
FIG. 4 is a flowchart representative of example machine-readable instructions and/or example operations that may be executed, instantiated, and/or performed by example programmable circuitry to implement the example video sequence analyzer circuitry of FIG. 1 to detect temporally static image area(s) in accordance with teachings disclosed herein.

Flowcharts representative of example machine readable instructions, which may be executed by programmable circuitry to implement and/or instantiate the video sequence analyzer circuitry 115 of FIG. 1 and/or representative of example operations which may be performed by programmable circuitry to implement and/or instantiate the video sequence analyzer circuitry 115 of FIG. 1, are shown in FIGS. 3-4. The machine readable instructions may be one or more executable programs or portion(s) of one or more executable programs for execution by programmable circuitry, such as the programmable circuitry 1412 shown in the example processor platform 1400 discussed below in connection with FIG. 14 and/or may be one or more function (s) or portion(s) of functions to be performed by the example programmable circuitry (e.g., an FPGA) discussed below in connection with FIGS. 15 and/or 16. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 3-4, many other methods of implementing the example video sequence analyzer circuitry 115 of FIG. 1 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed, instantiated, and/or performed by programmable circuitry to implement the example video sequence analyzer circuitry 115 of FIG. 1. The machine readable instructions and/or the operations 300 of FIG. 3 begin at block 305, at which the frame identifier circuitry 202 retrieves a first frame of a video sequence (e.g., identified as part of the input video 105 of FIG. 1). Based on the first frame input retrieved by the frame identifier circuitry 202, the convolutional neural network circuitry 204 initiates a convolutional neural network (CNN) to complete one or more convolution and pooling layer(s) of the CNN (block 310), as described in more detail in connection with FIG. 5. To save intermediate results of the convolution and/or pooling layers, the buffer locator circuitry 206 identifies available buffer(s) for storage of the intermediate results and saves the intermediate results to the buffer(s) (block 315). For example, the buffer locator circuitry 206 can save results of a first convolution layer of the first video sequence frame to a first buffer, results of the pooling layer to a second buffer, results of a second convolution layer to a third buffer, results of a flatten layer to a fourth buffer, etc., as shown in connection with FIG. 5. Once the first frame of the video sequence is processed using the convolutional neural network circuitry 204, the frame identifier circuitry 202 retrieves the next frame in the input video sequence (block 320). In some examples, the static image identifier circuitry 208 detects temporally static image area(s) in the video sequence before processing the next input frame identified by the frame identifier circuitry 202 (block 325). For example, the static image identifier circuitry 208 (1) performs static image detection using encoding information from motion compensation and/or (2) identifies a difference between current and previous frames, as described in more detail in connection with FIG. 4.

In the example of FIG. 3, if the static image identifier circuitry 208 determines that the next frame can be skipped based on the identified static image area(s) (block 330), the data retriever circuitry 210 retrieves the final CNN-based processing results from the previous frame to use in place of processing the next frame (block 335). For example, the next frame can be skipped when the identified static image area(s) meet a threshold indicating that the entire frame or a majority of the frame is replicated. If the static image identifier circuitry 208 determines that the frame is not to be skipped based on the identified static image area(s) and/or lack of identified static image area(s) (block 330), the data retriever circuitry 210 retrieves the intermediate results associated with the previously processed frame(s) and stored in the one or more buffer(s) (block 340). As such, the convolutional neural network circuitry 204 proceeds to complete CNN-based processing of the next frame by combining convolutions for the updated frame regions with pre-calculated results for the static region(s) identified using the previous frame (block 345), thereby reducing the total amount of processing that needs to be performed on the newly input frame in the video sequence. If the frame identifier circuitry 202 identifies another frame in the input video sequence (block 350), control returns to block 315, where the buffer locator circuitry 206 proceeds to save the intermediate results of the processed frame to the one or more buffer(s) for use in subsequent frame processing. Once the frame identifier circuitry 202 does not identify any subsequent frame(s) (block 350), the video sequence analysis is complete.

FIG. 4 is a flowchart representative of example machine readable instructions and/or example operations 325 that may be executed, instantiated, and/or performed by programmable circuitry to implement the example static image identifier circuitry 208 of FIG. 2 to detect temporally static image area(s) in accordance with teachings disclosed herein. In the example of FIG. 4, the static image identifier circuitry 208 determines the presence of encoding information associated with motion compensation (block 405). If the encoding information is present (e.g., the input video 105 of FIG. 1 is a high frame-rate video), the static image identifier circuitry 208 proceeds to identify the encoding information from motion vectors (block 410), followed by identifying difference(s) between a current frame of analysis and a previously processed frame to determine temporally static image area(s) (block 415), as described in more detail in connection with FIG. 11. If the static image identifier circuitry 208 does not have access to encoding information (block 405), the static image identifier circuitry 208 can proceed to identify the temporally static image area(s) based on a difference between the current frame and the previous frame. For example, the static image identifier circuitry 208 identifies the current frame and the previous frame (block 420). In some examples, the frame identifier circuitry 202 retrieves the current frame(s) and previous frame(s). The static image identifier circuitry 208 proceeds to subtract the previous frame from the current frame (block 425) and identify the static region(s) based on the presence of zero value(s) (block 430), which are used to indicate static regions, as described in more detail in connection with FIG. 10. In some examples, a combination of both static area identification techniques disclosed herein can be used to identify the static areas.

Figure 5:
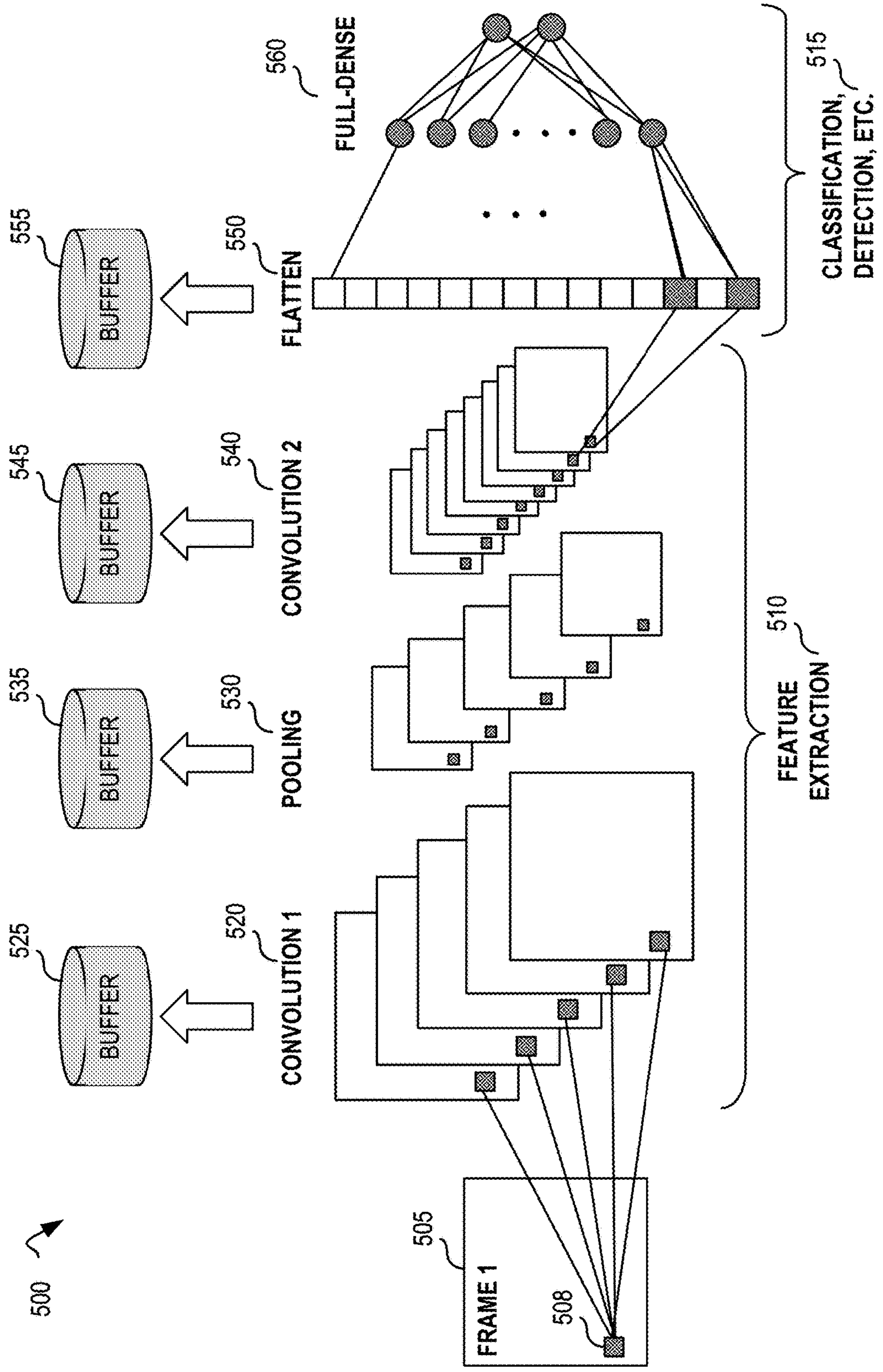
FIG. 5 illustrates an example convolutional neural network (CNN) architecture for video sequences, including buffering intermediate results in accordance with teachings disclosed herein.

FIG. 5 illustrates an example convolutional neural network (CNN) architecture 500 for video sequences, including buffering intermediate results in accordance with teachings disclosed herein. In the example of FIG. 5, a first frame 505 of an input video sequence (e.g., input video 105 of FIG. 1) is processed by the convolutional neural network circuitry 204 of FIG. 2. For example, the first frame 505 undergoes feature extraction 510 and classification and/or detection 515. The feature extraction 510 includes an example first convolution layer 520, an example pooling layer 530, and an example second convolution layer 540. The classification and/or detection 515 includes an example flatten layer 550 and an example full-dense layer 560. As shown in FIG. 5, convolutions use an example kernel 508 to extract features from an input image or video frame. Any intermediate data stored from the frame processing through the layer(s) 520, 530, 540, 550 can be stored in one or more buffer(s) 525, 535, 545, 555. In some examples, individual buffer(s) 525, 535, 545, 555 are assigned to store intermediate data associated with a specific layer of the convolutional neural network. For example, buffer 525 stores intermediate frame processing data associated with the first convolution layer 520, buffer 535 stores intermediate frame processing data associated with pooling layer 530, and buffer 545 stores intermediate frame processing data associated with the second convolution layer 540. In the example of FIG. 5, buffer 555 can be used to store intermediate data associated with the flatten layer 550 of the neural network. Since video sequences may have similarities between neighbor frames (e.g., static regions), the video sequence analyzer circuitry 115 of FIG. 1 saves intermediate results of the convolution/pooling layers 520, 530, 540 between frames and uses them for machine learning-based processing of the next frames. Such optimization can eliminate any convolution and activation calculations up to a flatten layer for the static regions of the next frames. Depending on the particular CNN configuration (e.g., number of pooling layers), the frame specific number of skipped layers may vary. As shown in the example of FIG. 5, per-layer CNN results are stored in the buffer(s) 525, 535, 545, 555 after CNN processing of each frame such that the data can be retrieved before the next frame processing regions.

Figure 6:
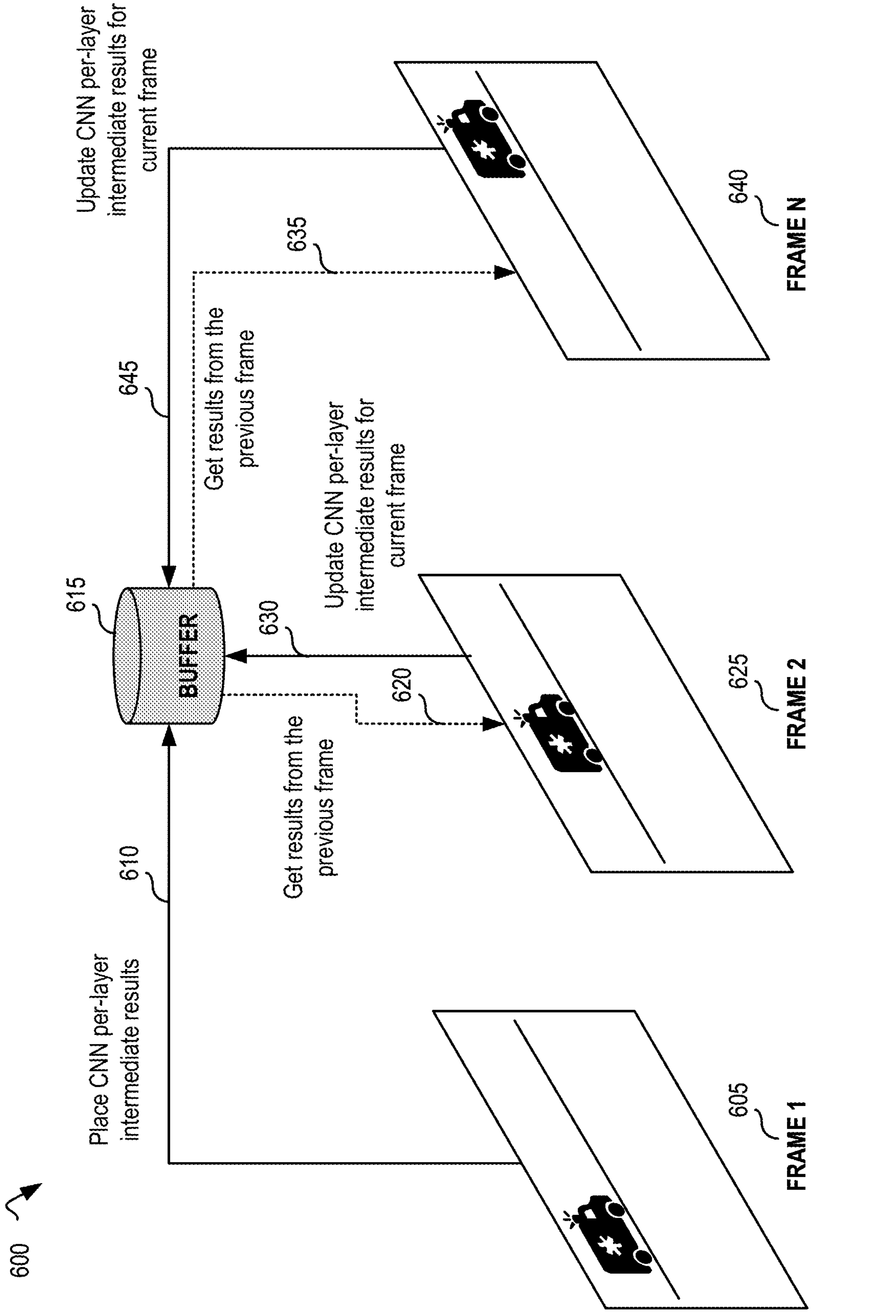
FIG. 6 illustrates an example updating of the buffer before and/or after CNN-based processing for each frame of a video sequence.

FIG. 6 illustrates an example updating 600 of a buffer before and/or after CNN-based processing for each frame of a video sequence. In the example of FIG. 6, a first frame 605 is associated with CNN per-layer intermediate results 610 that are stored in buffer 615. For example, as described in connection with FIG. 5, the buffer locator circuitry 206 saves intermediate results of convolution/pooling layers into the buffer (e.g., buffer 615). In some examples, the intermediate results represent individual outputs of respective neurons for a given layer of the neural network. For example, the intermediate results can be associated with the convolution/pooling layers between frames of an input video sequence. Prior to processing of a second frame 625, the intermediate results 610 are retrieved at 620 from the buffer 615 (e.g., using the data retriever circuitry 210 of FIG. 2). For example, as described in connection with FIG. 5, the data retriever circuitry 210 retrieves intermediate results from the buffer associated with the previous frame(s). Subsequently, the CNN per-layer intermediate results 630 for the second frame 625 are updated and stored in the buffer 615. At 635, the data retriever circuitry 210 retrieves the stored intermediate data before processing of frame n 640, with the buffer 615 updated after the per-layer intermediate results 645 for frame n 640 become available. As such, the stored intermediate data can be used to replace real convolution calculations for static regions.

Figure 7:
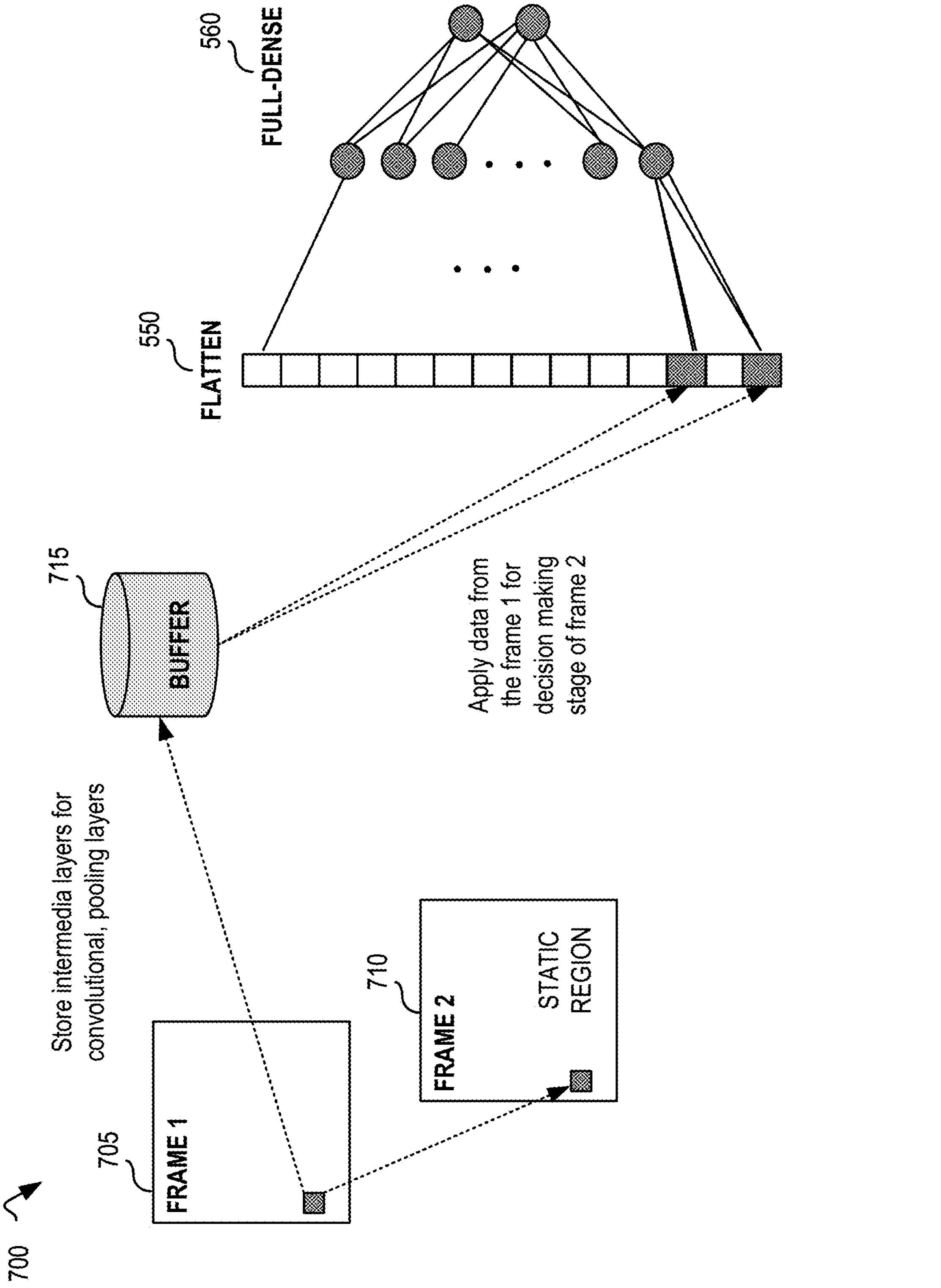
FIG. 7 illustrates using previously kept convolution data for subsequent frame analysis.

FIG. 7 illustrates use of previously stored convolution data for subsequent frame analysis 700 that allows for the skipping of several layers of a convolutional neural network during video sequence frame processing. For example, intermediate data for a first frame 705 is stored in buffer 715 and used for the assessment of a second frame 710 during the flatten layer 550 and full-dense layer 560 analysis associated with the convolutional neural network described in connection with FIG. 4. In some examples, the intermediate data is applied to the neurons of the neural network for the assessment of the next layer based on the interconnections of the neural network architecture. The size of static image areas and the overall CNN architecture (e.g., kernel size and pooling layers) can affect what CNN layers take information from the buffer (e.g., buffer 715). In the example of FIG. 3, all feature extraction layers of the CNN are skipped up to the flatten layer 550. However, in some examples, a subset of the layers are optimized based on the stored intermediate data, as shown in connection with FIG. 8.

Figure 8:
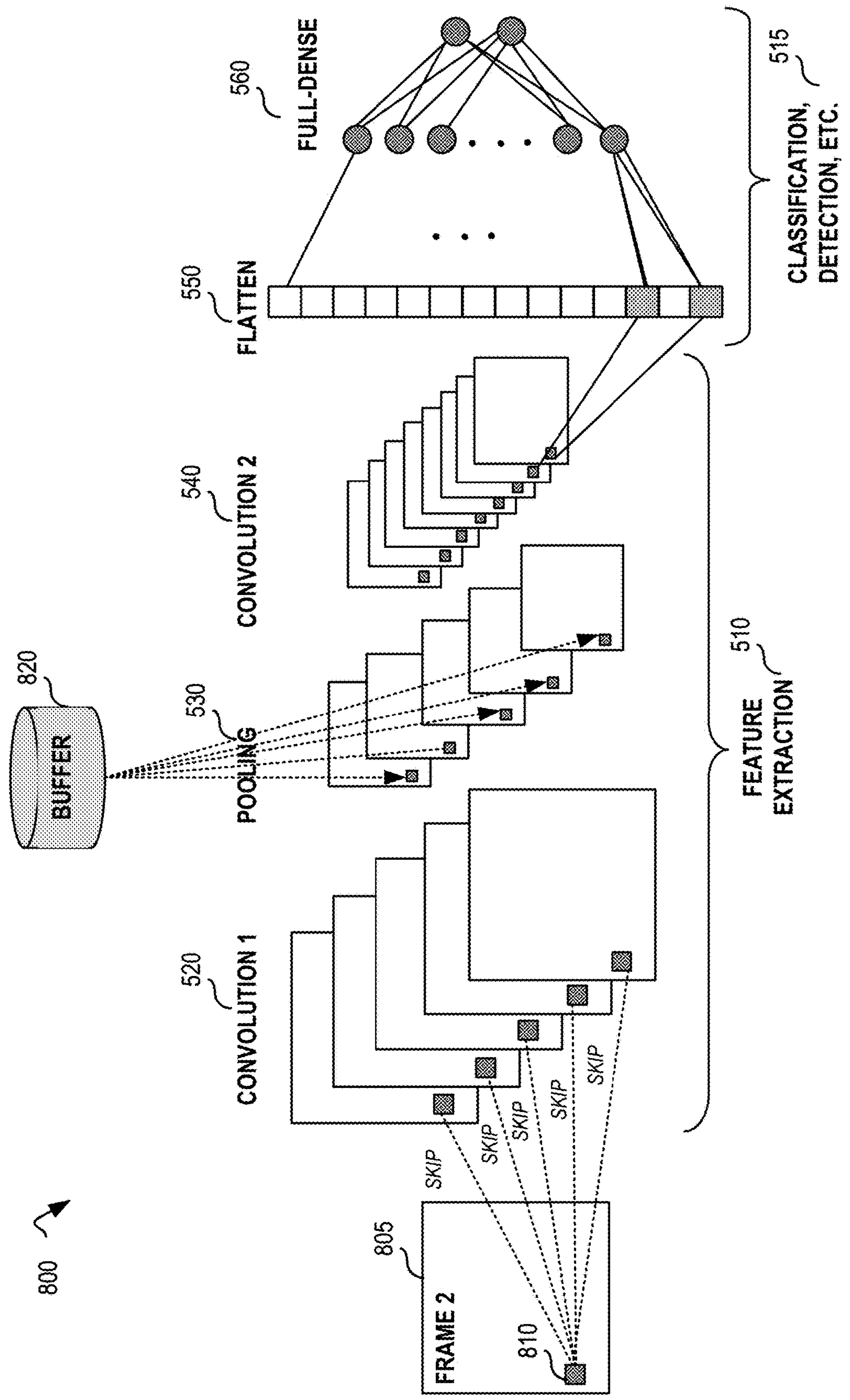
FIG. 8 illustrates example optimization of several layers in the neural network.

FIG. 8 illustrates example optimization 800 of several layers in the neural network. In the example of FIG. 8, a second frame 805 includes kernel(s) 810. For example, a kernel represents a basic unit of image filtering, acting as a mask or a filter that modifies the value of a pixel based on the values of surrounding pixels. As such, the kernel is a matrix where the value of each element of the kernel represents a weight assigned to a corresponding pixel. In the example of FIG. 8, skip connections can be applied to skip layers in the neural network and feed output(s) of one layer as the input to the next multiple layer(s). In the example of FIG. 8, intermediate data (e.g., the results of the convolution layer 520 of a preceding frame) stored in a buffer 820 is accessed in the pooling layer 530 of the feature extraction 510 process. As such, the overall processing time of the second frame 805 is reduced, but not to the same extent as shown in connection with FIG. 7, where several layers of the neural network can be skipped during the video sequence frame processing.

Figure 9:
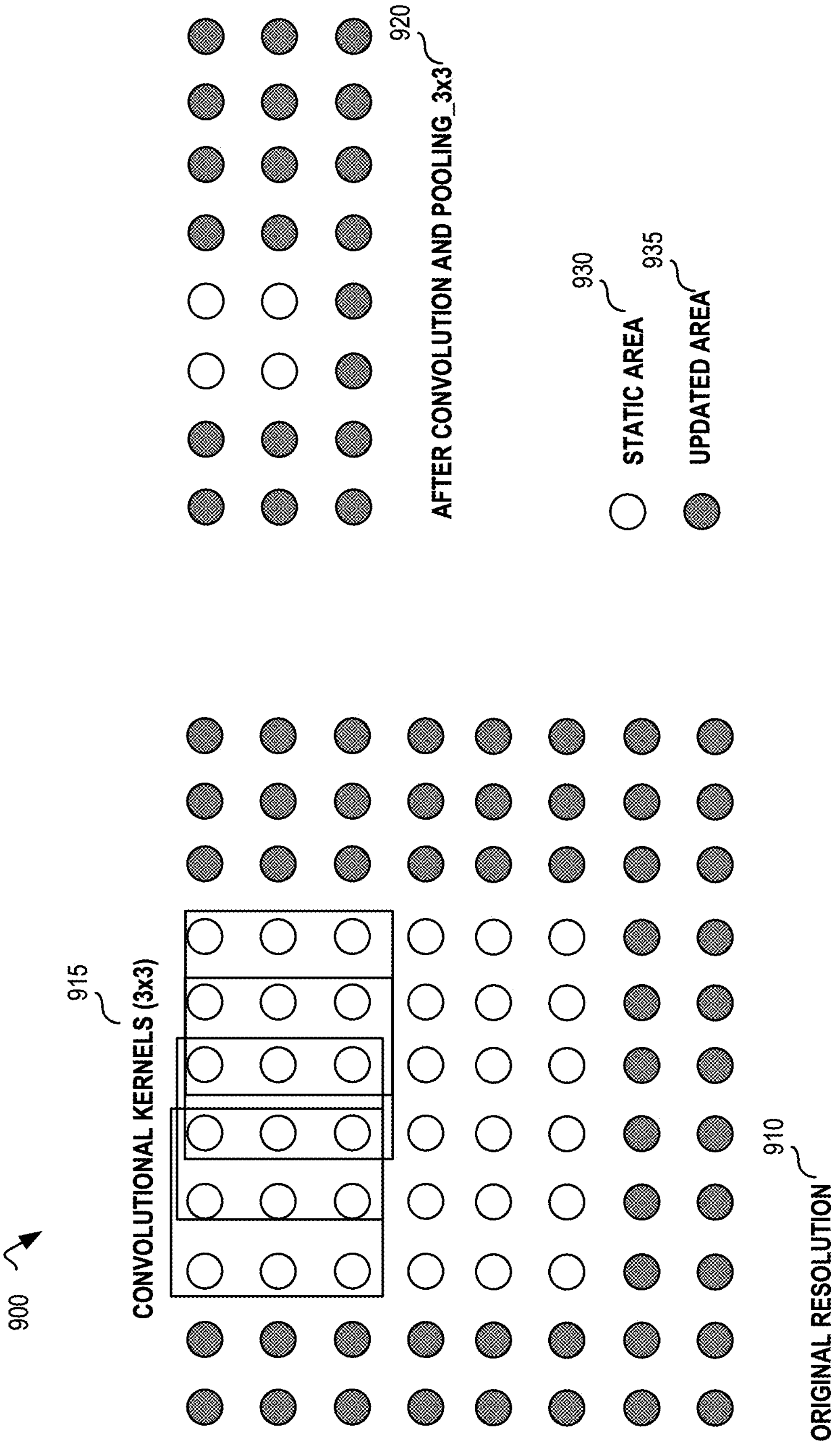
FIG. 9 illustrates an example temporally static region position in an original image and after convolution and pooling.

FIG. 9 illustrates an example temporally static region position 900 in an original image and after convolution and pooling. For example, pooling layers are used to reduce the dimensions of feature maps to reduce the amount of computation to perform. As such, the pooling layer summarizes features present in a region of the feature map generated by a convolution layer, such that further operations are performed on the summarized features. In the example of FIG. 9, convolution uses kernels to extract features from an input image. For example, kernel dimensions can be 3×3 and there are multiple such kernels in a given filter representing a concatenation of multiple kernels. In the example of FIG. 9, an example original resolution 910 is shown with convolutional kernels (e.g., 3×3 kernels), including example results 920 obtained after convolution and pooling has been completed, where example static area(s) 930 are shown with a white circle and example updated area(s) 935 are shown with a dark circle. As such, intermediate data results from a previous frame can be used for a first convolutional layer.

Figure 10:
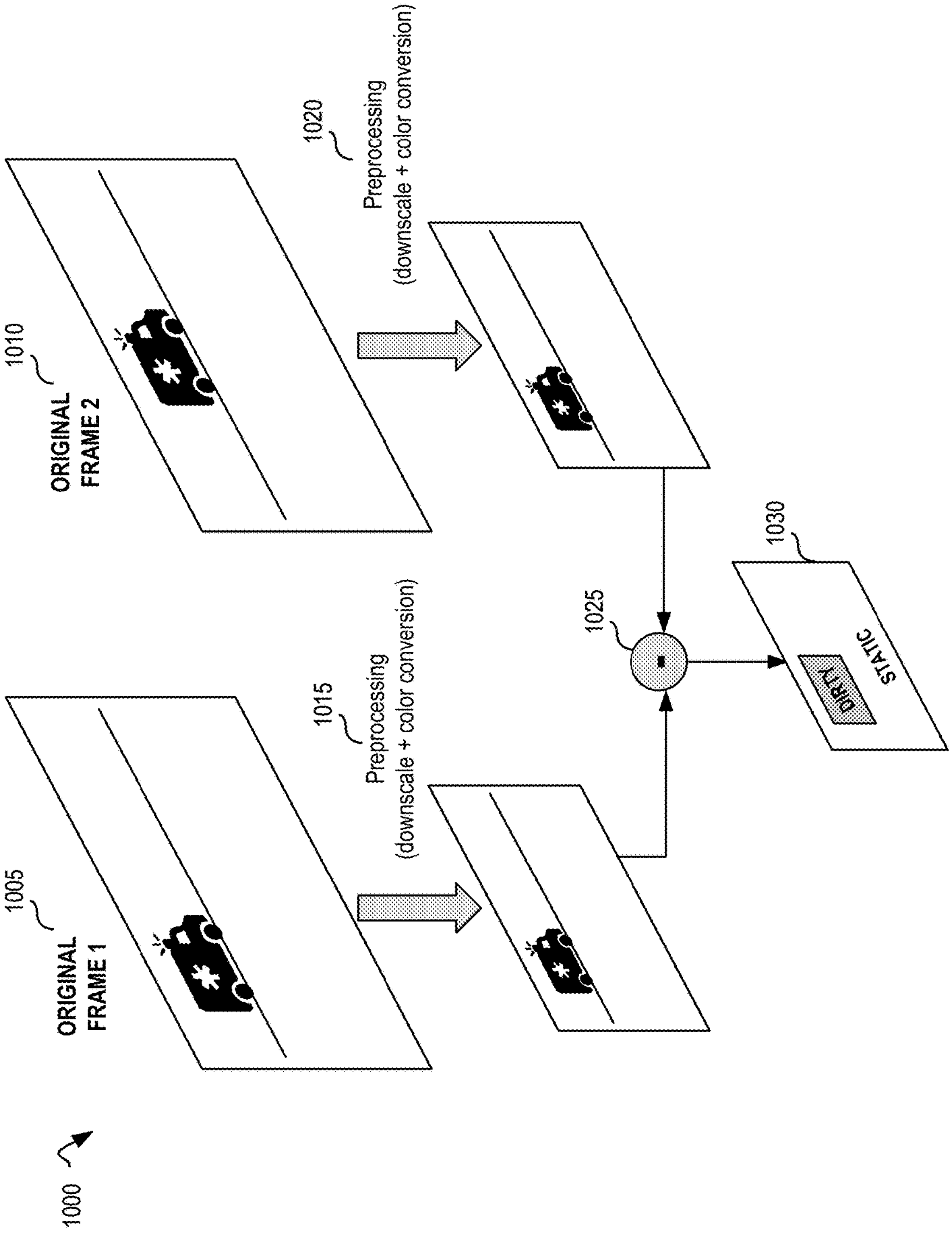
FIG. 10 illustrates an example pixel-domain static region detector used to identify temporally static regions.

FIG. 10 illustrates example pixel-domain static region detection 1000 used to identify temporally static regions. As previously described, detection of temporally static regions in video sequences can be performed in multiple ways (e.g., using the static image identifier circuitry 208 of FIG. 2). In some examples, a previous frame can be stored (e.g., in the pixel domain) and subtracted from a current frame (e.g., such that zero values are used to indicate static region(s)), which can be performed after preprocessing stages on the targeted machine-learning based resolution, as shown in FIG. 10. For example, video compression focuses on minimization of temporal differences where possible without significantly affecting video quality. Thus, the size of temporally static areas can be large, especially for high frame rate videos encoded with low quality. In the example of FIG. 10, a first original frame 1005 and a second original frame 1010 can be preprocessed to perform downscaling and color conversion (e.g., the first original frame is preprocessed using preprocessing 1015 and the second original frame is preprocessed using preprocessing 1020). An example difference 1025 can be determined using the static image identifier circuitry 208 of FIG. 2, yielding a resulting frame 1030 indicating static regions that are consistent with both the first original frame 1005 and the second original frame 1010.

Figure 11:
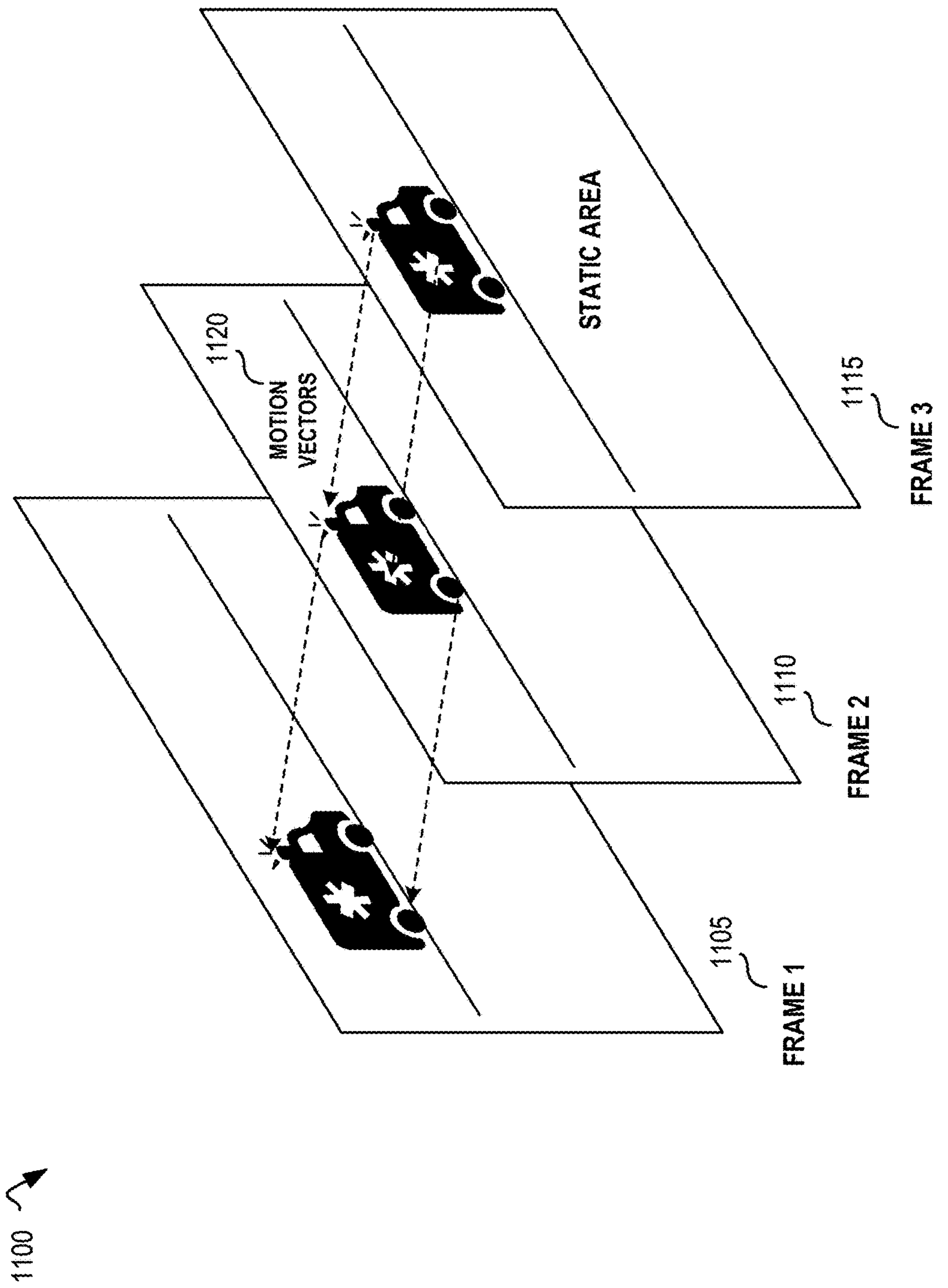
FIG. 11 illustrates an example approach for static region detection over compressed video sequences using specific encoding information from motion compensation.

FIG. 11 illustrates an example approach 1100 for static region detection over compressed video sequences using encoding information from motion compensation. As previously described, encoding information from motion compensation can be used to determine static regions in frame (s). For example, modern video coding standards (e.g., Mpeg2, H.264, H.265, AV1, VVC) efficiently decrease temporal redundancy using the motion compensation approach. Motion compensation keeps previous frames (e.g., reference frames) and encodes only the difference between a current frame and a previous frame(s). For example, the difference is encoded using motion vectors which define what region of the reference frame should be used. This approach increases compression efficiency, especially for high frame-rate videos where the temporal difference is relatively small. In the example of FIG. 11, a first frame 1105, a second frame 1110, and a third frame 1115 are used to identify static area(s) in the frame(s) 1105, 1110, 1115 using motion vector 1120.

Figure 12:
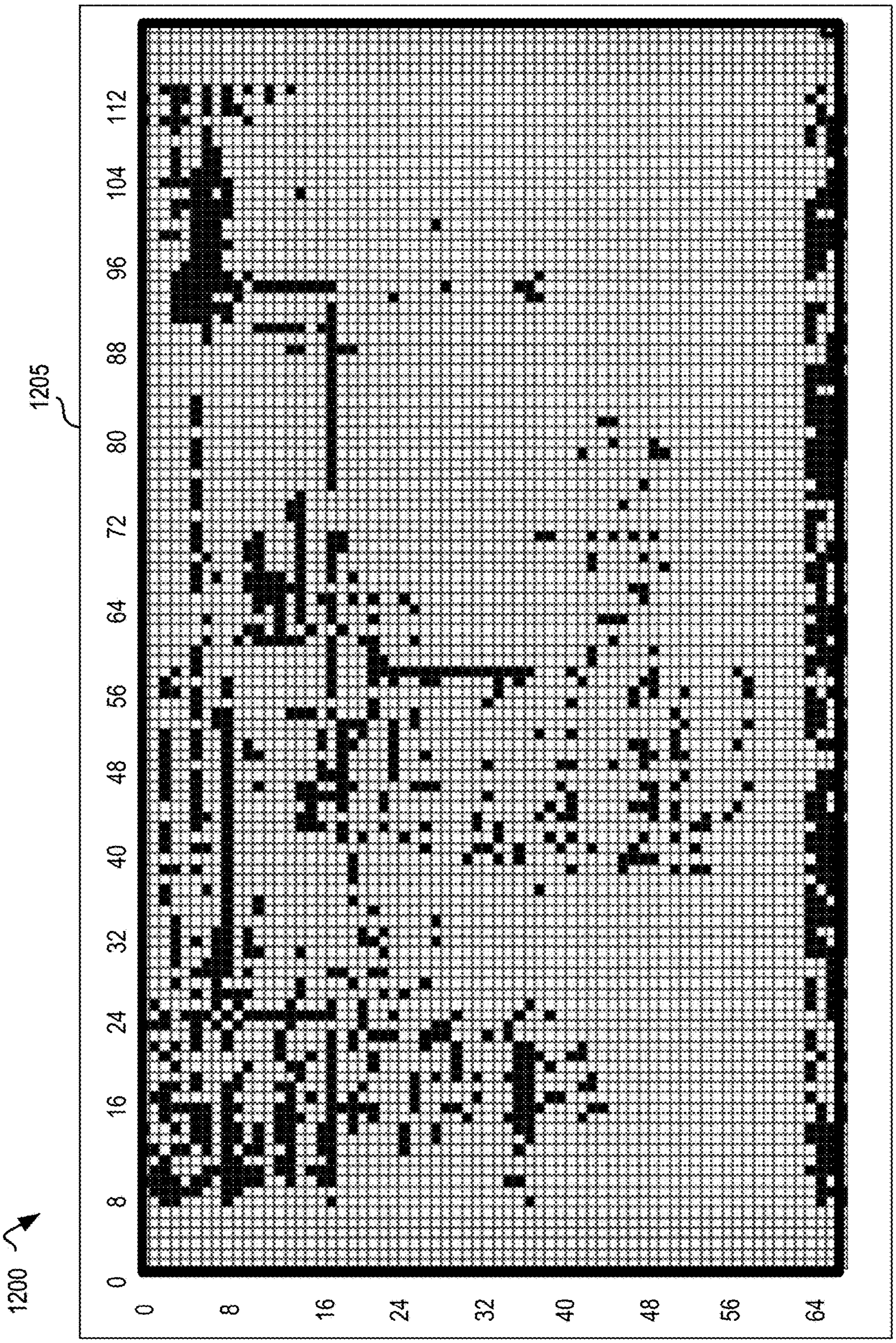
FIG. 12 illustrates an example macroblock map of an encoded video sequence frame.

FIG. 12 illustrates an example macroblock map 1200 of an encoded video sequence frame 1205. For example, due to motion compensation, static image areas can be encoded with skipped macroblocks (e.g., indicating no differences identified with relation to previous frames). FIG. 12 shows an example of an encoded image with a stable background (e.g., where white macroblocks are skipped). Thus, information about static regions can be identified by parsing the compressed bitstream. In some examples, a side effect of video compression includes the removal of small pixel deviations between statically collocated regions due to quantization of coefficients in the frequency domain, thereby increasing the probability of skipped macroblocks, especially if a quantization parameter is relatively high. Compressed videos can also contain labels marking an entire frame as skipped, indicating that the current frame is identical to the previous reference frame. Thus, as described in connection with example disclosed herein, convolutional neural network (CNN) operations can be skipped and machine learning-based results from previous frame(s) can be used instead.

FIG. 13 illustrates an example table 1300 with percentages of skipped macroblocks after the encoding of different 1080p sequences 1305. Table 1300 represents the percentage of skipped macroblocks after encoding different 1080p sequences 1305 (e.g., using Intel MediaSDK Gen12 AVC encoder) and different bitrates 1310, 1315, 1320, 1325. For example, the different 1080p sequences 1305 include DOTA, GTAV, and CROWD_RUN, with performance gains depending on the percentage(s) of area(s) encoded as skipped macroblocks/coding units. For low bitrate encoding numbers of skipped macroblocks, performance gain can reach 70-80%, translating to 70%-80% of the related machine learning-based increase in speed. For medium bitrates, the percentage of skipped macroblocks is lower, but still approximately 50%. The range of bitrates where the number of skipped macroblocks is relatively high points to the methods and apparatus disclosed herein being used for, but not limited to, streaming (e.g., cloud gaming, virtual desktop infrastructure, etc.).

Figure 14:
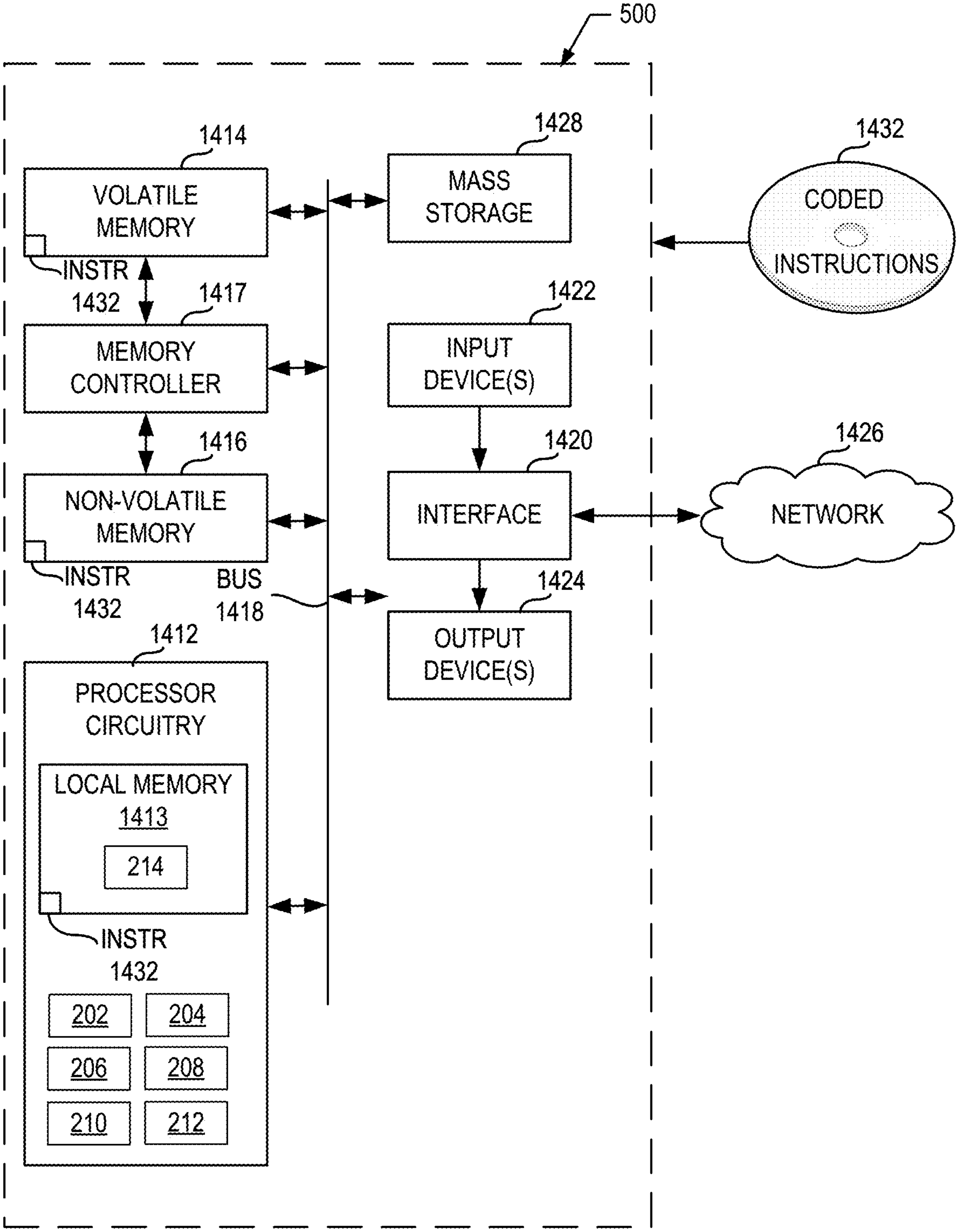
FIG. 14 is a block diagram of an example processing platform including programmable circuitry structured to execute, instantiate, and/or perform the example machine readable instructions and/or perform the example operations of FIGS. 3-4 to implement the video sequence analyzer circuitry of FIG. 1.

FIG. 14 is a block diagram of an example programmable circuitry platform 1400 structured to execute and/or instantiate the example machine-readable instructions and/or the example operations of FIGS. 3-4 to implement the example video sequence analyzer circuitry 115. The programmable circuitry platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs microprocessors, CPUs, GPUs, DSPs, and/or microcontrollers from any desired family or manufacturer. The programmable circuitry 1412 may be implemented by one or more semiconductor based (e.g., silicon based) devices. In this example, the processor circuitry 1412 implements the frame identifier circuitry 202, the convolutional neural network circuitry 204, the buffer locator circuitry 206, the static image identifier circuitry 208, the data retriever circuitry 210, and/or the output generator circuitry 212.

The programmable circuitry 1412 of the illustrated example includes a local memory 1413 (e.g., a cache, registers, etc.). The programmable circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The programmable circuitry platform 1400 of the illustrated example also includes one or more mass storage devices 1428 to store software and/or data. Examples of such mass storage devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine executable instructions 1432, which may be implemented by the machine readable instructions of FIGS. 3 and/or 4, may be stored in the mass storage device 1428, in the volatile memory 1414, in the non-volatile memory 1416, and/or on at least one non-transitory computer readable storage medium such as a CD or DVD which may be removable.

Figure 15:
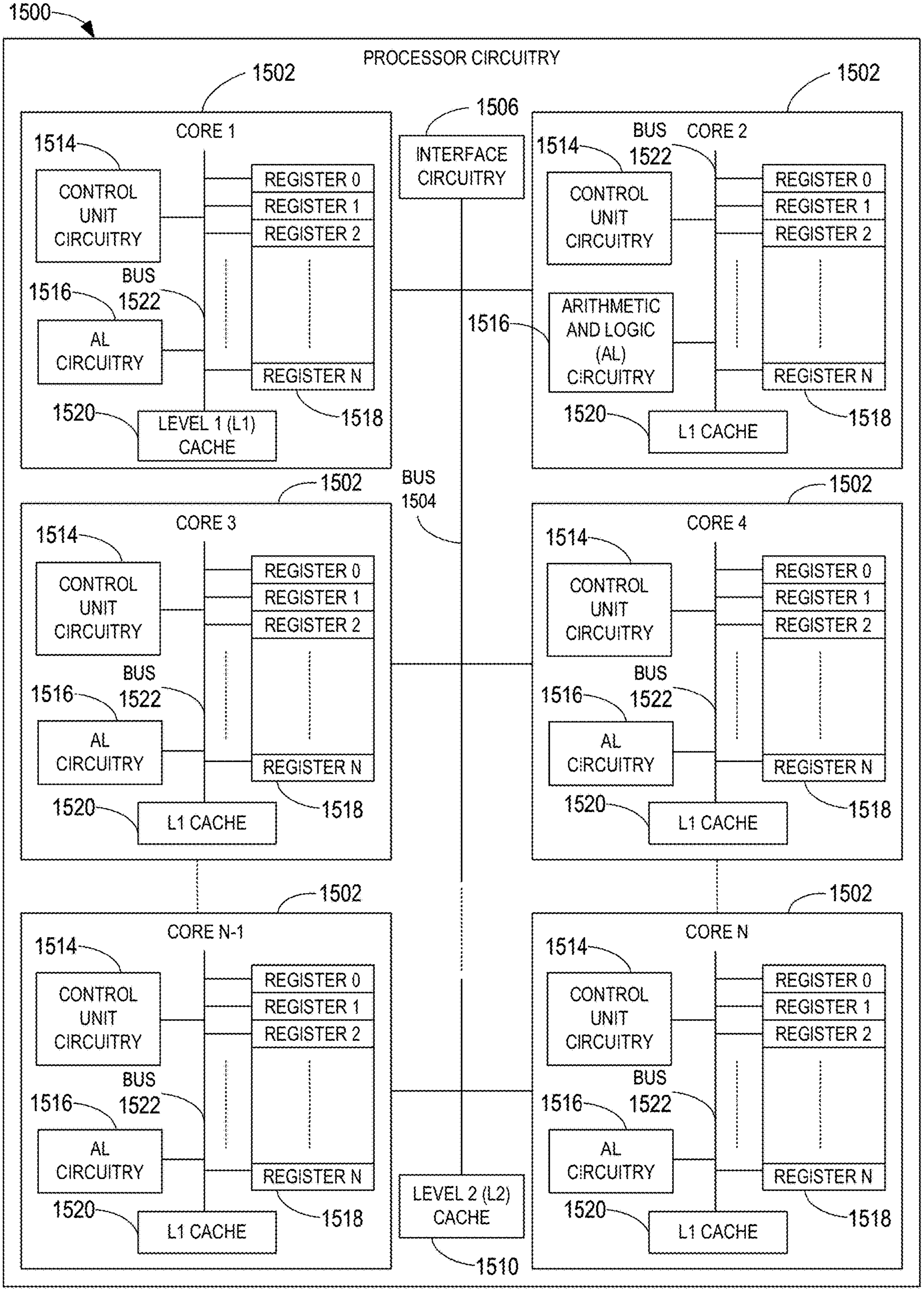
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general purpose microprocessor (e.g., general purpose microprocessor circuitry). The microprocessor 1500 executes some or all of the machine readable instructions of the flowchart of FIGS. 3 and/or 4 to effectively instantiate the circuitry of FIG. 2 logic circuits to perform the operations corresponding to those machine readable instructions. In some such examples, the circuitry of FIG. 2 is instantiated by the hardware circuits of the microprocessor 1500 in combination with the instructions. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 3 and/or 4.

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer-based operations. In other examples, the AL circuitry 1516 also performs floating-point operations. In yet other examples, the AL circuitry 1516 may include first AL circuitry that performs integer-based operations and second AL circuitry that performs floating point operations. In some examples, the AL circuitry 1516 may be referred to as an Arithmetic Logic Unit (ALU).

The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may be implemented by at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages.

The microprocessor 1500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1500, in the same chip package as the microprocessor 1500 and/or in one or more separate packages from the microprocessor 1500.

Figure 16:
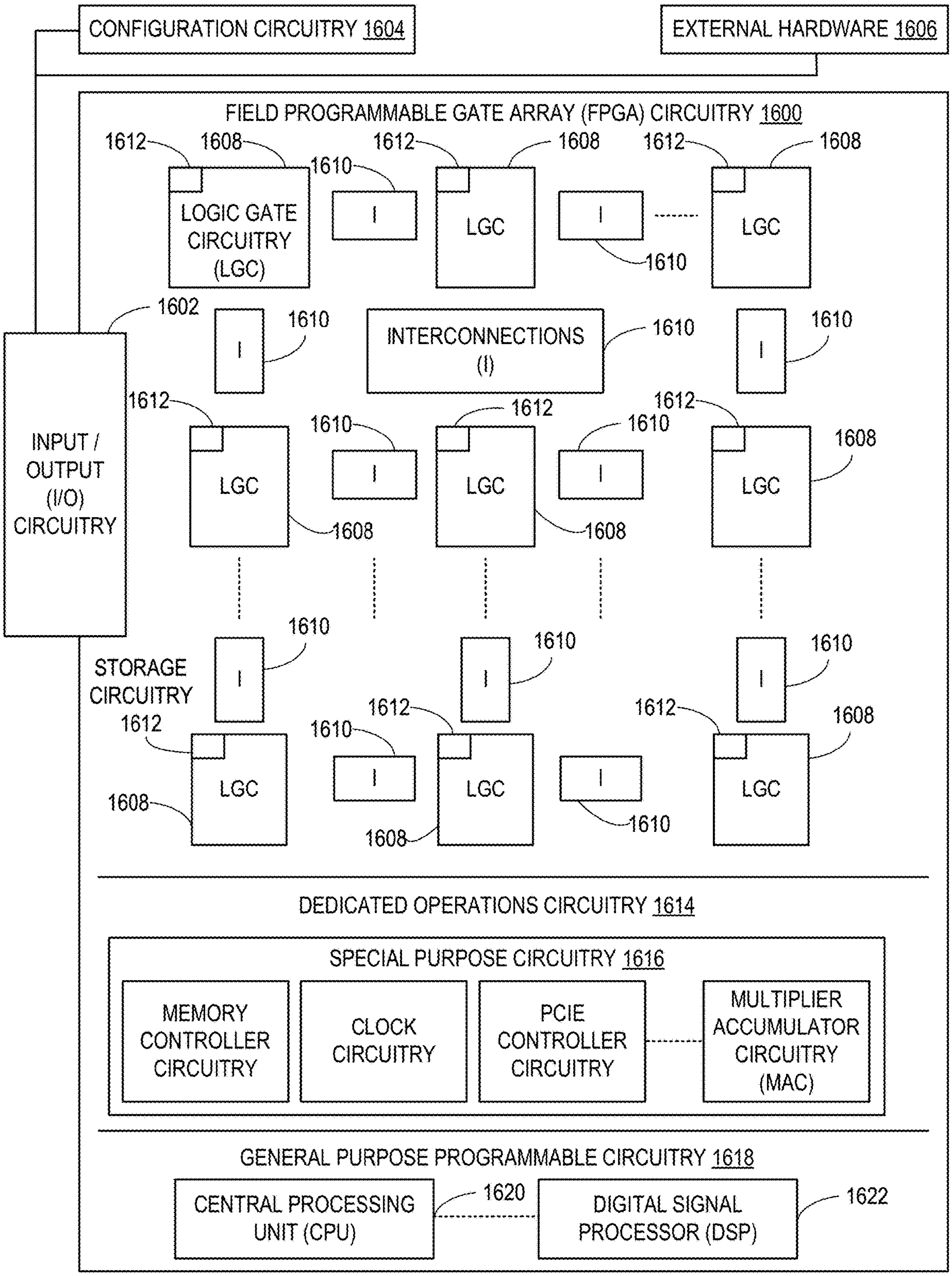
FIG. 16 is a block diagram of another example implementation of the programmable circuitry of FIG. 14.

FIG. 16 is a block diagram of another example implementation of the programmable circuitry of FIG. 14. In this example, the programmable circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 1600 of the example of FIG. 16 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 3 and/or 4. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 3 and/or 4. As such, the FPGA circuitry 1600 may be configured and/or structured to effectively instantiate some or all of the operations/functions corresponding to the machine readable instructions of the flowcharts of FIGS. 3 and/or 4 as dedicated logic circuits to perform the operations/functions corresponding to those software instructions in a dedicated manner analogous to an ASIC. Therefore, the FPGA circuitry 1600 may perform the operations/functions corresponding to the some or all of the machine readable instructions of FIGS. 3 and/or 4 faster than the general-purpose microprocessor can execute the same.

In the example of FIG. 16, the FPGA circuitry 1600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain a binary file, which may be implemented by a bit stream, data, and/or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine readable instructions of FIGS. 3-4 and/or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the programmable circuitry 1412 of FIG. 14, many other approaches are contemplated. For example, FPGA circuitry may include an on-board CPU, such as one or more of the example CPU 1620 of FIG. 16. Therefore, the programmable circuitry 1412 of FIG. 14 may additionally be implemented by combining at least the example microprocessor 1500 of FIG. 15 and the example FPGA circuitry 1600 of FIG. 16. In some such hybrid examples, one or more cores 1602 of FIG. 16 may execute a first portion of the machine readable instructions represented by the flowchart(s) of FIGS. 3-4 to perform first operation(s)/function(s), the FPGA circuitry 1600 of FIG. 16 may be configured and/or structured to perform second operation(s)/function(s) corresponding to a second portion of the machine readable instructions represented by the flowcharts of FIGS. 3-4, and/or an ASIC may be configured and/or structured to perform third operation(s)/function(s) corresponding to a third portion of the machine readable instructions represented by the flowcharts of FIGS. 3-4.

It should be understood that some or all of the circuitry of FIG. 2 may, thus, be instantiated at the same or different times. For example, same and/or different portion(s) of the microprocessor 1500 of FIG. 15 may be programmed to execute portion(s) of machine-readable instructions at the same and/or different times. In some examples, same and/or different portion(s) of the FPGA circuitry 1600 of FIG. 16 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1500 of FIG. 15 may execute machine readable instructions in one or more threads executing concurrently and/or in series. In some examples, the FPGA circuitry 1600 of FIG. 16 may be configured and/or structured to carry out operations/functions concurrently and/or in series. Moreover, in some examples, some or all of the circuitry of FIG. 2 may be implemented within one or more virtual machines and/or containers executing on the microprocessor 1500 of FIG. 15.

In some examples, the programmable circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the programmable circuitry 1412 of FIG. 14 which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

Figure 17:
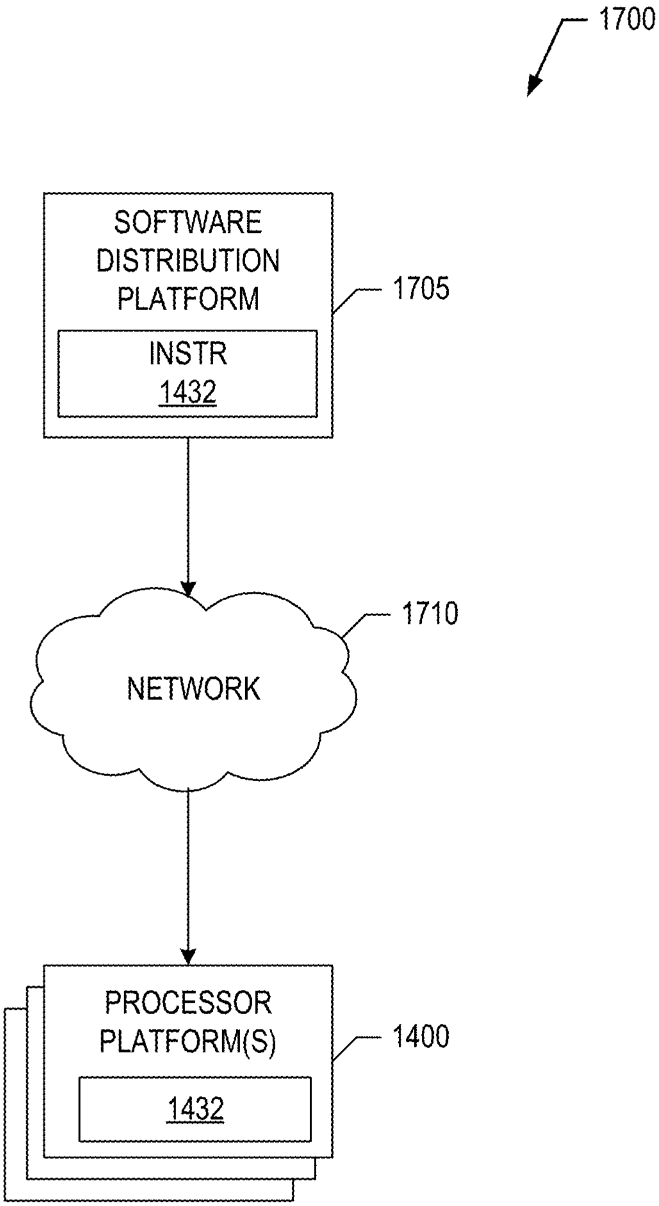
FIG. 17 is a block diagram of an example software/firmware/instructions distribution platform (e.g., one or more servers) to distribute software, instructions, and/or firmware (e.g., corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1432 of FIG. 14 to other hardware devices (e.g., hardware devices owned and/or operated by third parties from the owner and/or operator of the software distribution platform) is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions of FIGS. 3-4, as described above. The one or more servers of the example software distribution platform 1705 are in communication with an example network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions of FIG. 3-4, may be downloaded to the example programmable circuitry platform 1400, which is to execute the machine readable instructions 1432 to implement the video sequence analyzer circuitry 115. In some examples, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices. Although referred to as software above, the distributed "software" could alternatively be firmware.

From the foregoing, it will be appreciated that example systems, methods, apparatus, and articles of manufacture have been disclosed that permit retention of per-layer convolutional neural network (CNN) intermediate data of a current frame for use in subsequent frame processing to simplify the machine-learning analysis (e.g., skipping calculations of temporal stable or predicted regions of the frames). Examples disclosed herein can be applied to any image recognition and detection neural network. For example, intermediate results of the CNN-based convolution/pooling layers between frames can be saved and used for machine learning-based processing of subsequent frames, eliminating convolution and activation calculations up to a flatten layer for the static regions. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for efficient execution of convolutional neural networks for compressed video sequences are disclosed herein. Further examples and combinations thereof include the following:

Example 1 includes an apparatus comprising interface circuitry, machine readable instructions, and programmable circuitry to at least one of instantiate or execute the machine readable instructions to process a first frame of a video sequence with a neural network, store intermediate outputs of at least one of a convolution layer or a pooling layer of the neural network, the intermediate outputs associated with the first frame, and process a second frame of the video sequence based on the intermediate outputs associated with the first frame to skip processing of a temporally static image area of the second frame by the at least one of the convolution layer or a pooling layer, the temporally static image area common to the first frame and the second frame.

Example 2 includes the apparatus of example 1, wherein the programmable circuitry is to save the intermediate outputs to a buffer.

Example 3 includes the apparatus of example 1, wherein the programmable circuitry is to detect the temporally static image area of the second frame before processing of the second frame with the neural network.

Example 4 includes the apparatus of example 3, wherein the programmable circuitry is to skip processing of the second frame with the neural network based on a threshold associated with temporally static areas.

Example 5 includes the apparatus of example 4, wherein, when the second frame is skipped, the programmable circuitry is to apply final neural network-based processing results associated with the first frame for the second frame.

Example 6 includes the apparatus of example 1, wherein the programmable circuitry is to determine the temporally static image area based on encoding information from motion vectors associated with motion compensation performed on the second frame.

Example 7 includes the apparatus of example 1, wherein the programmable circuitry is to determine the temporally static image area based on a difference between the first frame and the second frame.

Example 8 includes a method comprising processing a first frame of a video sequence with a neural network, storing intermediate results of at least one of a convolution layer or a fully-connected dense layer of the neural network, the intermediate results associated with the first frame, and processing a second frame of the video sequence based on the intermediate results associated with the first frame to skip processing of a temporally static image area of the second frame by the at least one of the convolution layer or a pooling layer, the temporally static image area common to the first frame and the second frame.

Example 9 includes the method of example 8, further including saving the intermediate results to a buffer.

Example 10 includes the method of example 8, further including detecting the temporally static image area of the second frame before processing of the second frame with the neural network.

Example 11 includes the method of example 10, further including skipping processing of the second frame with the neural network based on a threshold associated with detected temporally static areas.

Example 12 includes the method of example 11, wherein, when the second frame is skipped, further including applying final neural network-based processing results associated with the first frame for the second frame.

Example 13 includes the method of example 8, further including determining the temporally static image area based on encoding information from motion vectors associated with motion compensation performed on the second frame.

Example 14 includes the method of example 8, further including determining the temporally static image area based on a difference between the first frame and the second frame.

Example 15 includes a non-transitory machine readable storage medium comprising instructions to cause programmable circuitry to at least process a first frame of a video sequence with a neural network, store intermediate results of at least one of a convolution layer or a pooling layer of the neural network, the intermediate results associated with the first frame, and process a second frame of the video sequence based on the intermediate results associated with the first frame to skip processing of a temporally static image area of the second frame by the at least one of the convolution layer or a pooling layer, the temporally static image area common to the first frame and the second frame.

Example 16 includes the non-transitory machine readable storage medium of example 15, wherein the instructions are to cause the programmable circuitry to save the intermediate results to a buffer.

Example 17 includes the non-transitory machine readable storage medium as defined in example 15, wherein the instructions are to cause the programmable circuitry to detect the temporally static image area of the second frame before processing of the second frame with the neural network.

Example 18 includes the non-transitory machine readable storage medium as defined in example 17, wherein the instructions are to cause the programmable circuitry to skip processing of the second frame with the neural network based a threshold associated with detected temporally static areas.

Example 19 includes the non-transitory machine readable storage medium as defined in example 18, wherein the instructions are to cause the programmable circuitry to apply final neural network-based processing results associated with the first frame for the second frame.

Example 20 includes the non-transitory machine readable storage medium as defined in example 15, wherein the instructions are to cause the programmable circuitry to determine the temporally static image area based on encoding information from motion vectors associated with motion compensation performed on the second frame.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
- interface circuitry;
- machine readable instructions; and
- programmable circuitry to at least one of instantiate or execute the machine readable instructions to:
  - process a first frame of a video sequence with a neural network;
  - store intermediate outputs of at least one of a convolution layer or a pooling layer of the neural network, the intermediate outputs associated with the first frame; and
  - process a second frame of the video sequence based on the intermediate outputs associated with the first frame to skip processing of a temporally static image area of the second frame by the at least one of the convolution layer or a pooling layer, the temporally static image area common to the first frame and the second frame.

2. The apparatus of claim 1, wherein the programmable circuitry is to save the intermediate outputs to a buffer.

3. The apparatus of claim 1, wherein the programmable circuitry is to detect the temporally static image area of the second frame before processing of the second frame with the neural network.

4. The apparatus of claim 3, wherein the programmable circuitry is to skip processing of the second frame with the neural network based on a threshold associated with temporally static areas.

5. The apparatus of claim 4, wherein, when the second frame is skipped, the programmable circuitry is to apply final neural network-based processing results associated with the first frame for the second frame.

6. The apparatus of claim 1, wherein the programmable circuitry is to determine the temporally static image area based on encoding information from motion vectors associated with motion compensation performed on the second frame.

7. The apparatus of claim 1, wherein the programmable circuitry is to determine the temporally static image area based on a difference between the first frame and the second frame.

8. A method comprising:
- processing a first frame of a video sequence with a neural network;
- storing intermediate results of at least one of a convolution layer or a pooling layer dense layer of the neural network, the intermediate results associated with the first frame; and
- processing a second frame of the video sequence based on the intermediate results associated with the first frame to skip processing of a temporally static image area of the second frame by the at least one of the convolution layer or a pooling layer, the temporally static image area common to the first frame and the second frame.

9. The method of claim 8, further including saving the intermediate results to a buffer.

10. The method of claim 8, further including detecting the temporally static image area of the second frame before processing of the second frame with the neural network.

11. The method of claim 10, further including skipping processing of the second frame with the neural network based on a threshold associated with detected temporally static areas.

12. The method of claim 11, wherein, when the second frame is skipped, further including applying final neural network-based processing results associated with the first frame for the second frame.

13. The method of claim 8, further including determining the temporally static image area based on encoding information from motion vectors associated with motion compensation performed on the second frame.

14. The method of claim 8, further including determining the temporally static image area based on a difference between the first frame and the second frame.

15. A non-transitory machine readable storage medium comprising instructions to cause programmable circuitry to at least:
- process a first frame of a video sequence with a neural network;
- store intermediate results of at least one of a convolution layer or a pooling layer of the neural network, the intermediate results associated with the first frame; and
- process a second frame of the video sequence based on the intermediate results associated with the first frame to skip processing of a temporally static image area of the second frame by the at least one of the convolution layer or a pooling layer, the temporally static image area common to the first frame and the second frame.

16. The non-transitory machine readable storage medium of claim 15, wherein the instructions are to cause the programmable circuitry to save the intermediate results to a buffer.

17. The non-transitory machine readable storage medium as defined in claim 15, wherein the instructions are to cause the programmable circuitry to detect the temporally static image area of the second frame before processing of the second frame with the neural network.

18. The non-transitory machine readable storage medium as defined in claim 17, wherein the instructions are to cause the programmable circuitry to skip processing of the second frame with the neural network based a threshold associated with detected temporally static areas.

19. The non-transitory machine readable storage medium as defined in claim 18, wherein the instructions are to cause the programmable circuitry to apply final neural network-based processing results associated with the first frame for the second frame.

20. The non-transitory machine readable storage medium as defined in claim 15, wherein the instructions are to cause the programmable circuitry to determine the temporally static image area based on encoding information from motion vectors associated with motion compensation performed on the second frame.

* * * * *